United States Patent

[11] 3,626,044

| [72] | Inventor | Guy Arnaud<br>Route de Peney, Satigny, Switzerland |
|---|---|---|
| [21] | Appl. No. | 875,598 |
| [22] | Filed | Nov. 10, 1969 |
| [45] | Patented | Dec. 7, 1971 |
| [32] | Priority | Nov. 8, 1968 |
| [33] | | Switzerland |
| [31] | | 16700/68 |

[54] PROCESS FOR MANUFACTURING A CURVED COMPOSITE FOAMED PANEL
10 Claims, 7 Drawing Figs.

[52] U.S. Cl. .................................................... 264/45,
264/54, 264/253, 264/261, 264/338, 52/309,
52/618, 161/161, 264/46
[51] Int. Cl. ....................................................... B29d 27/04
[50] Field of Search ........................................... 264/45, 47,
54, 46, 251, 253, 261, 338; 161/161; 52/309, 618

[56] References Cited
UNITED STATES PATENTS
3,111,569  11/1963  Rubenstein.................. 264/45 X
3,289,703  12/1966  Brown........................ 264/47 X

*Primary Examiner*—Philip E. Anderson
*Attorneys*—Robert E. Burns and Emmanuel J. Lobato

ABSTRACT: A partition or panel is formed of a plurality of reinforcing elements interlaced with bands of glass cloth and embedded in a polymerized resin foam. The reinforcing elements comprise a core of polymerized resin encased in a layer of glass fabric between a pair of laths. The reinforcing elements can be made with curved shapes by moulding between flat surfaces. The partition can be given a complex curvature by placing the reinforcing elements and interlaced glass cloth in a shuttering composed of a supple plastic sheet outwardly reinforced with laths transverse of the reinforcing elements and pouring an expansible resin foam, thereby eliminating the rigid conventional mould.

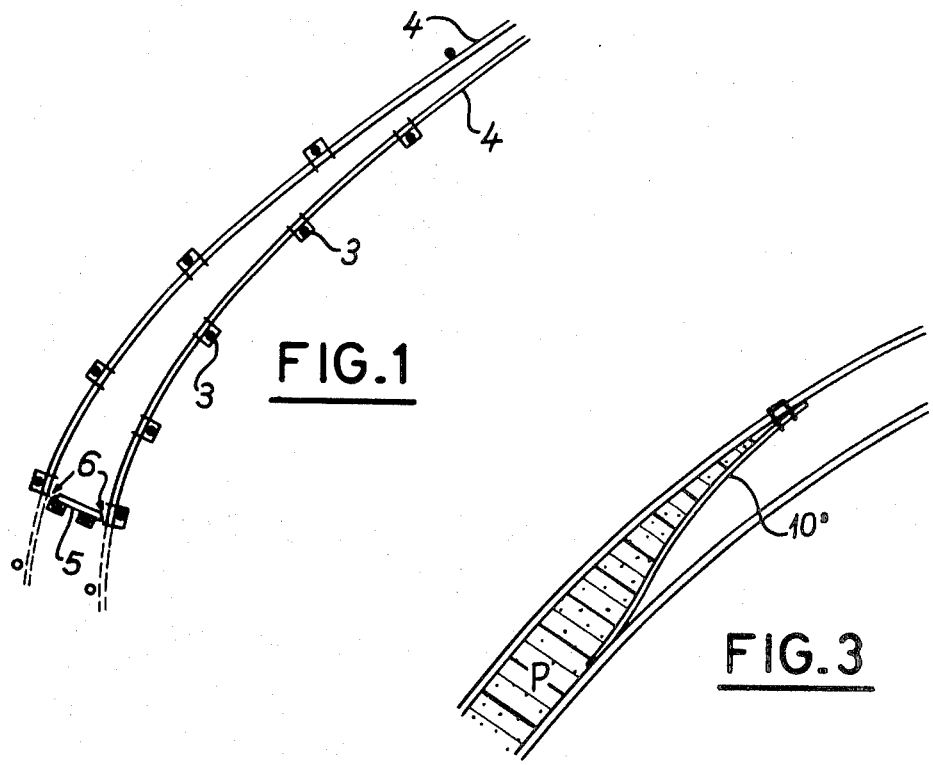
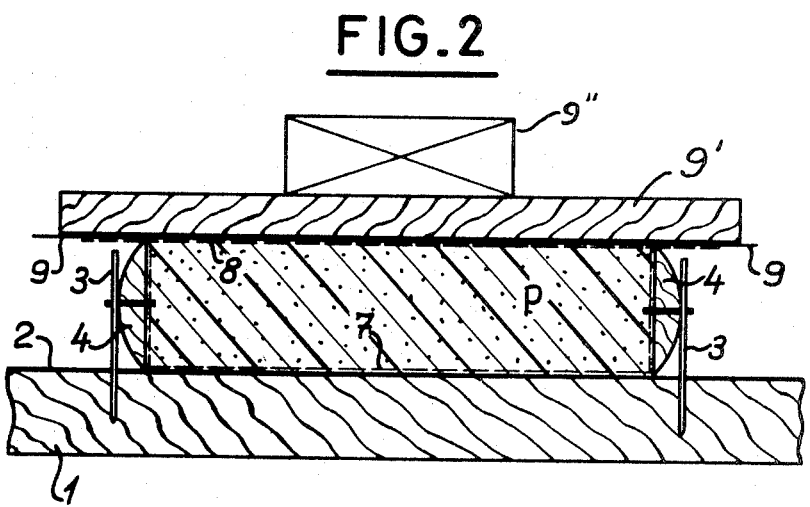

PROCESS FOR MANUFACTURING A CURVED COMPOSITE FOAMED PANEL

This invention relates to the manufacture of partitions and panels and is particularly but not exclusively concerned with the manufacture of curved panels such as a shell for a light boat or aircraft. Such panels are hereinafter generally referred to as "partitions."

Process for the fabrication of partitions using concrete, synthetic resins and other products that are poured into a mould until they are sufficiently hard, are well-known.

Known processes utilize a rigid mould, in which is possible placed reinforcing. In certain cases, the moulding must be carried out at a high temperature, and the mould must be waterproof and a resistance that necessarily renders it burdensome.

Once the partitions are out of the mould they can form construction units, soundproof and heatproof walls, packaging, shells for light boats, and can also find innumerable applications in various technical fields, such as in aviation, in the household, in building construction, and in naval architecture.

It is an object of the present invention to provide a process for the fabrication of partitions requiring a reduced amount of apparatus, notably not requiring the use of a rigid mould, and which enables partitions of good mechanical resistance and homogeneous structure to be obtained. According to the invention there is provided a process of shuttering.

The process proves particularly useful for naval or aeronautical applications where the lightness of the material used gives incontestable advantages, and where complex curved partitions are required.

The simplicity of the apparatus for carrying out this process leads to a considerable decrease in the cost price of the manufactured partition. The invention will be better understood by referring to the following description and to the attached drawing in in which:

FIG. 1 is a top plan view of a special device for the placing of laths in the course of producing a couple or bar;

FIG. 2 is a sectional view of a couple at the end of the production;

FIG. 3 shows a special embodiment of a couple in the course of production;

Figure 4:
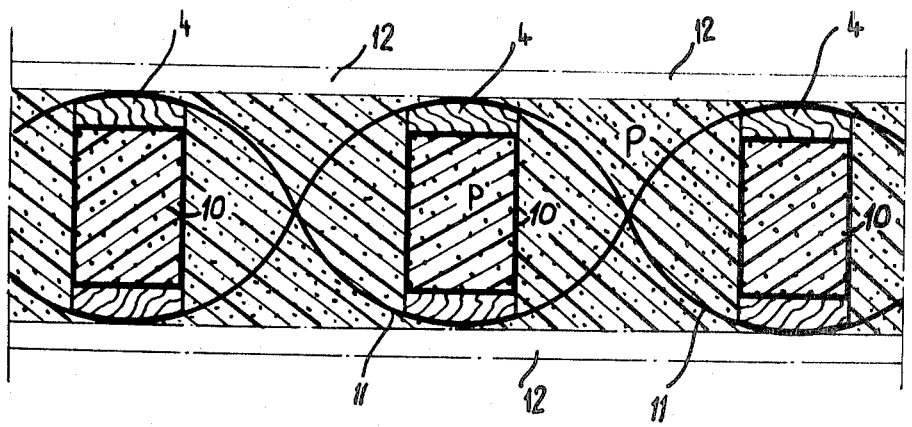
FIG. 4 is a schematic cross section showing a method of placing the bands of glasscloth interlacing couples, the whole being framed by shuttering (in dotted lines) and filled with polyurethane for the formation of walls, particularly curved walls, such as for boats.

Referring to FIGS. 1 and 2, the fabrication of the couples or bars is accomplished in the following manner:

On a wooden surface, preferably compressed wood board 1, a drawing of the couple is made, and then covered with a sheet of plastic material 2, for example polyethylene, nonadhesive to expanded resin foam. The outline of the drawing is picked out with nails 3, of which the heads are cut to a height slightly lower than the final thickness of couple. Next, wood or laminated material is fastened against the nails. Preferably these mouldings have a rounded form on the outside of the couple, in order to allow the subsequent placing of the shuttering, to obtain an enveloping curve without singular points.

Next are placed pieces 5, limiting the extremities of the couple. These pieces are preferably bevel-edged and have a length such that they leave a free space (3 mm., for example) at 6, between the pieces 5 and the material 4, in order to allow the escape of excess material due to expansion.

The walls of the frame thus obtained are covered with a glass mat 7 of glasscloth or glass wad. Expandable polymerizable thermosetting resin P, for example liquid polyurethane, is then poured into the frame. Only a thin layer is poured in, substantially thinner than the thickness of the couple to take into account the expansion of the polyurethane. The frame is then covered with a glass mat 8 of which the width is greater than the width of the couple. Finally, a heavy flat cover 9' possibly weighted down by a weight 9" is placed over the assembly, this cover having a sheet 9 of plastic material which is nonadhesive to the expanded resin, for example polyethylene. The weight of the cover 9' with its weight 9" can be about 10 kilos per linear meter of the couple, for example.

The glass mat 8 of which the width is greater than that of the couple, thus allow the formation, between the moulding 4 and the cover 9' of an air proof space which, during the expansion of the expanded resin foam allows the air contained therein to escape without forming pockets of air inside the expanded form.

In several minutes, the polyurethane poured between the laths forms a foam and attains its final hardness. The pressure at the end of expansion remains lower than 100 g./cm. 2. The work of removing the couple from the mould is easily carried out because of the presence of the sheets of nonadhesive plastic 2 and 9.

It is important to note that polyurethane possesses a porous structure of closed cells that do not expand in contact with smooth surfaces such as those of the laths or those of the sheets of plastic covering the wooden covers, and form a hard nonexpanded crust. This hard nonexpanded crust laminates with the glass mats 7 and 8 and thus ensures an excellent mechanical joint of polyurethane on the laths, and an excellent mechanical joint between the laths themselves. This crust is formed by the fact that the temperature of the outside layer remains inferior to the temperature of the expansion, or about 35° C., whilst the interior temperature attains at least 35° C., which is the temperature necessary for expansion.

It should be equally noted that to provide couples of considerable length, bratticing 10' can be utilized, as indicated on FIG. 3, to enable filling adjacent sections one at a time.

To produce a partition, the couples thus obtained are arranged in the desired position defining the shape of the partition. It is noted that the means of fastening these couples are only of a temporary nature and can be recuperated at the end of the production of a partition.

Figure 5:
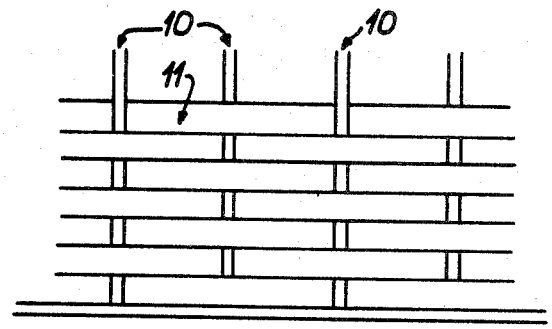
FIGS. 5 and 6 show, diagrammatically, a plan view and a sectional view of the assembly of FIG. 4 but for a flat instead of curved partition.
Figure 6:
Figure 7:
FIG. 7 is a sectional view of the shuttering.

Referring to FIGS. 4, 5 and 6, a band of laminated or nonlaminated unidirectional fabric 11, is interlaced between the couples 10. This band is composed of longitudinal fibers joined together by transversal fibers sufficient only to ensure the transversal joint of the longitudinal fibers: these bands fundamentally work under longitudinal constraint having, for example, a resistance to traction of 200 kg./cm. lengthwise and notably improving to some degree the mechanical resistance of the walls. Next a shuttering of plastic sheets 12, for example polyvinylchloride, with a thickness of 1 to 2 mm. and reinforced by battens placed about the couples 10 at 13, is placed about the couples 10. The said plastic material, for example polyvinylchloride, does not stick to the expanded resin and later allows easy removal from the mould. The battens 13, for example in wood, are glued on to the sheets of plastic material 12 and preferably have a separation slightly inferior to that of the width of the mouldings. The shuttering is put into place on the walls of the partition to produced, the battens 13 being situated towards the exterior of the partition and positioned at right angles to the planes of the couples. This method of shuttering thus enables complex surfaces to be obtained particularly a double curve in the two principal directions, the curve of the said surfaces imposed by the positioning of the couples being obtained owing to the pliable behavior of the battens 13, each of the said battens having a flat section of the interior surface or exterior surface of the wall and shaping up as a smooth curve.

The said shuttering 12 is put into place on the couples 10 by suitable fastening means starting at the lower part of the wall, preferably up to a height of the order of 40 cm. The filling of the polyurethane P is then carried out and a further section of shuttering placed. This filling by elements of height of 40 cm. overcomes the general inconveniences of expanded resin foam in detaching from the wall at the end of the expansion, that is to say, in the upper part of the wall so obtained. If the filling is carried out in this manner, the risk of coming unstuck is reduced and eliminated by the following filling. Polyurethane being obtained by a mixture of two products, it is naturally possible to utilize a mixing gun for the filling of the partition. This has the advantage of shortening the time between the mixing and the pouring.

As for removal from the mould, the partition obtained has a smooth surface the polyurethane forming, as already seen, in contact with the smooth surfaces of the shuttering, a hard but nonexpanded crust, very slightly hollowed out between the positions of the battens of the shuttering during moulding.

This surface is next covered with a layer of normally accelerated resin. It should be noted that all these operations have been carried out without a mould removing agent, these agents generally being inconvenient as they inhibit the polymerization of the resins thus applied to the surfaces.

Many ways of proceeding can be deduced without departing from the scope of the invention, in particular in the case of the production of standard partitions it would be possible to use much more elaborate tools.

It is important to note, that the assembled product obtained has a homogeneous structure. In fact, the smooth surfaces limiting the reinforcing elements or couples are dissolved by the polyurethane in filling the partitions and thus the reinforcement, which is the same constitution as the whole of the wall, does not constitute, in any way, hard points thus avoiding the classic phenomenen of blocking to the perpendicular to the reinforcement and the appearance of preferential fragile areas.

What is claimed is:

1. A process for manufacturing a curved panel, which comprises the steps of:
   a. casting a plurality of elongated curved bars from a foamable polymerizable thermosetting polymeric resin reinforced with high tensile material,
   b. assembling a plurality of said molded bars in spaced side-by-side relationship to define a curved panel shape,
   c. interweaving flexible high tensile strand material with said bars in the manner of a woven structure,
   d. placing sheets of flexible thermoplastic polymer material nonadherent to a polymerizable thermosetting polymeric resin on opposite sides of said assembled bars and interwoven strand material and conforming said sheets to the shape defined by said assembly,
   e. incrementally supporting said sheets in conformity with said assembly,
   f. introducing a foamable polymerizable thermosetting polymeric resin into the spaces between said bars and between said sheets,
   g. expanding and polymerizing said resin in situ to fill said spaces and to bond said bars and interwoven strand material into a unitary panel of a shape defined by the curvature of said bars and by the assembly of said bars relative to one another, and
   h. removing said sheets and the supporting means therefor.

2. A process according to claim 1, in which said bars are formed by the steps of:
   a. laying out the desired shape of a bar on a first supporting surface nonadherent to foamable polymeric resin,
   b. fixing spaced strips on said surface in conformity with the desired shape of said bar,
   c. introducing a foamable polymerizable thermosetting polymeric resin into the space between said strips,
   d. covering said space with a surface nonadherent to said resin to thereby enclose said space,
   e. expanding and polymerizing said resin to fill said space and thereby form a bar having a size and shape defined by said surfaces and said strips and,
   f. removing said strips and polymerized resin foam from said surfaces.

3. A process according to claim 2, in which said polymerized resin foam bonds to said strips which thereby constitute reinforcing elements of said bar.

4. A process according to claim 2, in which glass mat is placed between said surfaces and said foam, said foam bonding to said glass mat which thereby constitutes reinforcement of said bar.

5. A process according to claim 1, in which said strand material which is interwoven with said bars comprises strips of glass fiber fabric, alternate strips passing on opposite sides of respective bars.

6. A process according to claim 1, in which the supporting of said flexible thermoplastic polymer sheets is by a plurality of battens.

7. A process according to claim 6, in which said battens are spaced from one another, thereby permitting said sheet to bow out to some extent between successive battens.

8. A process according to claim 6, in which said battens are placed transversely of said bars.

9. A process according to claim 1, in which said sheets are applied section by section, said foamable polymerizable thermosetting polymeric resin being introduced into one section before the sheets of the next section are placed.

10. A process according to claim 1, in which said foamable polymerizable thermosetting polymeric resin is polyurethane.

* * * * *